Figures 1, 2:
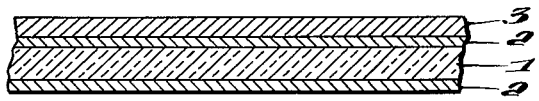

| APPLYING TO BOTH SIDES OF A POLYETHYLENE TEREPHTHALATE BASE FILM AN AQUEOUS SOLUTION OF TITANIUM ACETYL ACETONATE AND A HYGROSCOPIC SALT |
|---|

↓

| DRYING TO EFFECT CURING AND SOLVENT REMOVAL |
|---|

↓

| COATING ONE SIDE OF THE FILM WITH A LAYER OF POLYETHYLENE |
|---|

INVENTOR
WINFIELD SCOTT ZEHRUNG, III

BY Francis A. Paintin
AGENT

United States Patent Office 2,992,133
Patented July 11, 1961

2,992,133
COATED ORGANIC FILM AND PROCESS
Winfield Scott Zehrung III, Buffalo, N.Y., assignor to E. I. du Pont de Nemours and Company, Wilmington, Del., a corporation of Delaware
Filed Oct. 29, 1959, Ser. No. 849,469
12 Claims. (Cl. 117—76)

This invention pertains to coated films and, more particularly, to organic base films such as polyethylene terephthalate film having a continuous coating of a heat-sealable, thermoplastic organic polymeric material.

One of the great advances in the packaging industry in recent years has been the advent of organic base films such as polyethylene terephthalate which possess an unusual combination of properties such as high tensile strength, toughness, high modulus (stiffness), low moisture permeability, high transparency, good flexibility, etc., which particularly suit them for wide application as wrappers in the food, drug and general commodities fields. Many of these films, however, are essentially non-heat sealable because of (1) their high melting point and crystallinity, and/or (2) their tendency to degrade at temperatures required to effect strong heat seals.

One method for improving heat-sealability is to provide these films with coatings of other thermoplastic organic polymeric materials such as polyethylene, polypropylene, etc., which do have satisfactory heat seal characteristics. However, such coatings, when applied to both sides of a base film usually cause performance problems on conventional automatic packaging machinery. The coated films tend to drag excessively on the metal surfaces and/or actually stick to the heat sealing elements of the packaging machines. Furthermore, there is a tendency for an electrostatic charge to form on the surface of hydrophobic thermoplastic films such as the aforementioned one-side polymer coated films. This electrostatic charge also serves to interfere with the performance of these films on automatic packaging equipment by not permitting the films to slide easily over the metal surfaces.

It is the primary object of this invention, therefore, to provide a one-side polymer-coated film capable of producing commercially acceptable heat seals. It is another object to produce such a film while also reducing the susceptibility of the film to electrostatic charges. It is a further object of this invention to provide a one-side polymer-coated organic base film which may be satisfactorily heat sealed on conventional mechanical packaging equipment without sticking to the heated surfaces used for sealing. These and other objects will be more clearly apparent from the description which follows.

The foregoing and related objects are realized by the present invention which, briefly stated, comprises applying to both sides (surfaces) of a non-heat sealable organic base film a continuous coating of a dilute aqueous solution of a hygroscopic salt selected from the group consisting of calcium chloride, magnesium chloride and magnesium sulfate and a titanium organic compound obtained as the reaction product of 1 to 4 mols of acetylacetone with 1 mol of an alkyl titanate containing from 2 to 4 carbon atoms in the alkyl group, the weight percent of hygroscopic salt based on the weight of hygroscopic salt and said titanium organic compound being 25–67%; drying the coated film to remove solvent and to cure (harden) the coating thereon; and, thereafter, applying to one side only of said coated film a continuous coating of a heat sealable composition consisting essentially of a polymer of an alpha-olefin.

FIGURE 1 is a diagrammatic cross-section of one embodiment of a coated film in accordance with the present invention, the thicknesses, especially of the coating layers, being greatly enlarged. Therein, polyethylene terephthalate base film 1 is shown to have on both sides a continuous coating 2 of titanium acetyl acetonate and a hygroscopic salt. Over layer 2 on one side only is shown a continuous coating 3 consisting essentially of polyethylene. FIGURE 2 is a flow sheet illustrating a typical process of preparing the coated films in accordance with the present invention.

By "non-heat sealable organic base film" as used herein is meant any self-supporting organic film which, for all practical purposes, may not be heat sealed by conventional heat sealing apparatus by reason of (1) a high degree of crystallinity (particularly in the case of biaxially stretched film), (2) a high melting point, (3) a tendency to degrade at temperatures necessary to be used for sealing, or (4) a material change in dimensions at temperatures utilized for heat sealing. Typical of such films is the commercially important polyethylene terephthalate film, and the invention will be further described with specific reference to such film as the base film to be treated in accordance with this invention. Additional examples of non-heat sealable organic base films are films of polystyrene, polyvinyl chloride, regenerated cellulose, copolyesters of ethylene terephthalate and ethylene isophthalate, etc.

The polymeric coating compositions employed for top coating one side of the film in accordance with the present invention must be readily heat sealable on conventional sealing apparatus, i.e., must soften at a lower temperature than the base film. Particularly outstanding compositions are the polymers, i.e., homopolymers and copolymers, of alpha-olefins such as polyethylene, polypropylene, polybutylene, etc.

The process involves treating the non-heat sealable organic base film, prior to coating with the heat sealable polymeric composition, with an aqueous solution containing at least one of a specific class of titanium organic compounds and at least one of a group of specific hygroscopic salts. Treatment may be accomplished by dipping the film in the solution, brushing or painting the film with the solution, spraying the film with the solution using a gravure type press, etc. The method of applying the solution is not critical.

The titanium organic compounds in the solution are those compounds, hereinafter referred to as titanium acetyl acetonates, prepared by reacting from 1 to 4 mols of acetyl acetone with one mol of an alkyl titanate containing from 2 to 4 carbon atoms in the alkyl group, e.g., tetraisopropyl titanate. The preparation of these compounds is described in copending U.S. applications Serial Nos. 652,375 and 652,376, filed to Harold C. Brill on April 12, 1957, and assigned to the assignee of the present application.

They can be prepared by simply mixing together acetylacetone and an alkyl titanate in the ratio of 1 to 4 mols of acetylacetone per mol of alkyl titanate. The preferred reacting proportions are 2 mols of acetylacetonate per mol of alkyl titanate. A reaction occurs as evidenced by the evolution of heat and the production of a by-product alcohol corresponding to the alkyl group in the titanium. The reaction mixture is a liquid containing an alkyl titanate-acetylacetone reaction product and an alkyl alcohol corresponding to the alkyl groups in the ester used as the reactant. The alcohol can be removed by distillation, but it is preferred to leave it in the solution. The reaction mixture forms a precipitate when added to water in amounts which exceed about 3%. However, more concentrated, aqueous solutions of the reaction mixture in which the latter may form as much as 75% by weight of the solution without undesirable precipitation may be formed by an adjustment of the pH of the solution to below about 4.5 by the addition of a water-soluble acid, such as acetic, hydrochloric, formic or propionic acid. In the present invention, the concentration of the titanium acetyl acetonate is usually maintained below 5%, i.e., 0.5–5% in the aqueous medium. The aqueous medium in which the titanium acetyl acetonate is dissolved is not critical so long as the titanium compound is stable in the aqueous medium and the medium is sufficiently volatile to be evaporated after the solution is applied. It should be noted that the claimed process can use aqueous treating solutions containing a stabilizing acid, added alcohol, excess acetylacetone or by-product alcohol from the reaction between the alkyl titanate and acetylacetone.

The aqueous solution must also contain a hygroscopic salt selected from the group comprising calcium chloride, magnesium chloride and magnesium sulfate. The amount of the hygroscopic salt added to the titanium acetyl acetonate solution will be based upon the weight of titanium acetyl acetonate present in solution; the ratio of the weight of the hygroscopic salt to the weight of titanium acetyl acetonate in solution should range from 1:3 to 2:1. The preferred ratio by weight of salt to titanium compound should range from 1:1.5 to 2:1. The preferred salt is calcium chloride because of its excellent stability in the titanium acetyl acetonate solution and its great effectiveness in reducing the elecrtrostatic susceptibility of the base film. The selection of hygroscopic salts is based on several factors. The hygroscopic salt must reduce the electrostatic susceptibility of the one-side polymer coated film. It must do this without affecting adversely the improved heat-seal strength obtained, it is believed, by the presence of the titanium compound in the treating solution. And, the hygroscopic salt must not detract from the stability of the aqueous solution, i.e., no precipitation of the titanium compound should occur in the presence of the hygroscopic salt for at least 36 hours.

After treating the base film, the next step involves drying the film, usually at an elevated temperature. This can readily be accomplished by passing the film through a tunnel drier or other conventional heating apparatus. The time of exposure to the heat may range from a few seconds to several minutes at temperatures in the range of 100° C. up to the softening point of the film. Evaporation can usually be accomplished with a contact time of about 30–60 seconds at 105° C. or less time at higher temperatures.

The concentration of titanium acetyle acetonate deposited on each side of the film should range between 0.005–0.1% by weight, based on the total weight of the film, with the preferred range being .01–.05% by weight of titanium organic compound applied to each side of the film.

The polymeric coating composition, i.e., polyethylene or the like, is then applied. Any convenient method may be used. The extrusion coating equipment described in British Patent 688,637 may be used; a film of the coating polymer may be melt pressed on the treated base film; etc.

The product of the present invention, the treated one-side coated films, satisfy the long existing need in the packaging industry for a durable packaging film which is both readily heat sealable and which gives good performance on conventional mechanical packaging equipment. These highly versatile films are readily applicable to a wide variety of packaging uses such as overwraps (tray wraps, carton wraps, bundling), make and fill bags and pouches, contour bottom bags, etc. The outstanding feature of these films is their ability to be utilized on conventional packaging equipment without the occurrence of such performance problems as excessive drag or sticking to the heated surfaces used for sealing, thereby providing packaged units of good appearance and satisfactory seal strength.

The one-side coated films of the present invention also find great use in many electrical applications such as tape cables, binders, insulation protectors, plasticizer barriers, moisture-barrier impregnant dams, primary insulation and helically or longitudinally wrapped wire and cable.

A particularly important electrical use for the films of the present invention is in the form of tapes for primary or secondary insulation in wire and cable wrapping. The films of the present invention when employed for this purpose enjoy the following two important advantages over materials presently employed:

(1) The polyethylene coating on the polyethylene terephthalate base film acts as a non-slip coating, i.e., the strips do not readily slip loose from each other during winding.

(2) By wrapping the coated film of the present invention under certain temperature conditions, the polyethylene coated side will seal itself to the uncoated (polyethylene terephthalate) side. A moisture-proof wrapping is obtained thereby.

Pigments may also be added to the polyethylene coating, thus forming tapes or strips of different coloration. The pigmented film may also be printed, e.g., a white printed number on a black pigmented background. This feature finds great use in the electrical industry for identification purposes.

The following examples of several specific preferred embodiments will serve to illustrate more clearly the principles and practice of the present invention. Example 1 illustrates the best mode contemplated for carrying out the invention. In the examples, all percentages are by weight unless otherwise stated.

EXAMPLES 1–3

Substantially amorphous polyethylene terephthalate, prepared in accordance with the general procedure described in U.S. Patent 2,465,319 issued to Whinfield and Dickson was extruded in the form of thin films and oriented by stretching the film to substantially the same extent (at least 2.5× in both the longitudinal direction (LD) and transverse direction (TD) and heat set at 200°–220° C.).

The oriented heat-set films were then treated on both sides with a solution of titanium acetyl acetonate and a hygroscopic salt by passing the films through conventional coating and drying apparatus normally employed for a two-side coating of base films. The films were threaded around a roll located in a dip tank containing aqueous titanium acetyl acetonate and a hygroscopic salt and then between two doctor rolls. The dip tank contained a 1.5% titanium acetyl acetonate-.075% acetic acid-1% hygroscopic salt-water solution. The solution had been prepared by adding one mole of tetraisopropyl titanate to two mols of acetylacetone with rapid agitation until no further heat was developed, after which the reaction mixture was cooled to room temperature and dissolved in an equal volume of dilute acetic acid, then diluting the solution to the desired concentration by adding the necessary amount of water and finally by adding the hygroscopic salt.

After being coated, the films were passed through the conventional coating tower at a speed of 90 feet/minute. The lower section of the coating tower was maintained at 110° C. and the upper section at 125° C.

The thus treated films were then melt-coated on one side with a layer of polyethylene. Polyethylene [1] was extruded at a temperature of 300° C. onto one side of the treated polyethylene terephthalate film. Conventional extrusion coating equipment (such as described in British Patent 688,637, to Du Pont) was employed to provide coating thicknesses of about 0.3 mil.

As a control, a polyethylene terephthalate film was treated on both sides with a solution containing only the titanium compound and then coated on one side with a layer about 0.3 mil thick of polyethylene.

All of the films were tested for heat seal strength for both the coated (polyethylene) to coated side and coated

---

[1] "Alathon" 16 manufactured by E. I. du Pont de Nemours & Co.

to uncoated side and electrostatic susceptibility. The results of these tests and the particular hygroscopic salt used in the examples are listed in Table I.

and the stainless steel plate. The charge, thus generated on the film, discharges onto the stainless steel plate with which it is in contact and is measured by the meter. The

*Table I*

| Example No. | Hygroscopic Salt Added | Concentration of Titanium Compound per Side (parts/million) | Concentration of Hygroscopic Salt per Side (parts/million) | Heat-Seal Strength (grams/1.5 inches) | | Electrostatic Susceptibility | | Solution Stability (hours to form precipitate) |
|---|---|---|---|---|---|---|---|---|
| | | | | Coated to Coated Side | Coated to Uncoated Side | Coated Side | Uncoated Side | |
| 1 | Calcium chloride | 161 | 814 | 1203 | 357 | 64.4 | 11.7 | None after 675 hours. |
| 2 | Magnesium chloride | 130 | 656 | 1190 | 211 | 47.8 | 13.2 | 168. |
| 3 | Magnesium sulfate | 107 | 541 | 1245 | 315 | 61.4 | 58.8 | 48. |
| Control | None | 108 | None | 1300 | 680 | 116 | 137 | |

The heat seal strengths and electrostatic susceptibilities were determined as follows:

Heat seal strength (grams /1.5 inches) was measured by cutting a piece of the film to be tested 4" x 10" with the grain running in the long direction into two pieces 4" x 5". The two pieces were superimposed so that opposite surfaces were in contact. The two pieces of superimposed film were then sealed together at each end at right angles to the grain with a precision sealer. A ⅝" wide sealing bar heated to a temperature at which the film sample was to be sealed (at 20 pounds per square inch pressure) contacted the ends for 0.5 second. The sealed sheets were then cut in half at right angles to the grain. From the center of the four resulting pieces, 1½" wide strips parallel to the grain were cut. They were then tested by opening each set of strips at the free ends, placing them in a Suter Testing machine and pulling them apart. The heat-seal strength was the highest force in grams required to pull the strips apart. The minimum acceptable heat-seal strength for the coated-to-coated side test is 800 grams/1.5 inches. The minimum acceptable heat-seal strength for the uncoated-to-coated side test is 150 grams/1.5 inches.

Electrostatic susceptibility may be measured qualitatively or quantitatively. The qualitative test or hand test consists of rubbing a 1" x 10" strip of the film to be tested across the trouser leg ten times and recording the attraction of the film sample to one's hand or to a wall as none, slight, moderate or severe. The quantitative test or machine test involves supporting a strip of the film, trimmed to 1" x 4", on and in electrical contact with a flat, slightly roughened stainless steel plate, the plate being connected to a meter for measuring electrical potential but otherwise insulated from its surroundings. The plate is roughened by rubbing it lightly with a #100/120 Carborundum cloth, making various light scratches at right angles to the direction of movement of the film. A weighted, felt-covered block having a 1" x 2" face, presses the film into contact with the stainless steel plate. An electrostatic charge is generated by pulling the film for a distance of 3" between the weighted block value registered on the meter, the "electrostatic susceptibility," is a relative value and is useful for purposes of comparison. It compares the abilities of films to accumulate electrostatic charge under the influence of the friction normally encountered in manipulating or working with the films.

EXAMPLE 4

The purpose of this example was to determine the optimum concentration of calcium chloride in the aqueous solution of titanium acetyl acetonate for the purpose of the present invention. Aqueous solutions containing 1.5% titanium acetyl acetonate and from 0.25% to 2.5% calcium chloride were prepared as in Example 1. Polyethylene terephthalate film prepared as in Example 1 was treated with these solutions and then coated with polyethylene and finally tested as described in Example 1. The results are presented in Table II. A ratio of 1:1 calcium chlorid to titanium compound seems to produce optimum results.

*Table II*

| Test | Calcium Chloride Concentration (Weight Percent) | Ratio, CaCl₂/Ti Compound | Electrostatic Susceptibility | | | Heat-Seal Strength (grams/1.5 inches) | |
|---|---|---|---|---|---|---|---|
| | | | Hand Test | Machine Test | | Coated to Coated | Coated to Uncoated |
| | | | | Coated Side | Uncoated Side | | |
| A | 0 | 0 | Severe | 116 | 137 | 1,300 | 680 |
| B | 0.25 | 1:6 | do | 135 | 122 | 1,250 | 570 |
| C | 0.5 | 1:3 | Moderate | 127 | 61 | 1,165 | 403 |
| D | 1.0 | 1:1.5 | Slight | 64 | 12 | 1,203 | 357 |
| E | 1.5 | 1:1 | None | 33 | 9 | 1,201 | 290 |
| F | 2.0 | 1.3:1 | do | 10 | 2 | 1,103 | 290 |
| G | 2.5 | 1.6:1 | do | 4 | 0 | 903 | 180 |

Having fully described the invention, what is claimed is:

1. A process for producing a heat-sealable, organic polymeric film which comprises treating both sides of a polyethylene terephthalate base film with a dilute aqueous solution containing the reaction product of 1 to 4 mols of acetylacetone and 1 mol of an alkyl titanate containing 2 to 4 carbon atoms in the alkyl group and a hygroscopic salt selected from the group consisting of calcium chloride, magnesium chloride and magnesium sulfate, the weight percent of the hygroscopic salt, based on the weight of hygroscopic salt plus the reaction product, being 25-67%; drying the coated film; and, thereafter, applying to one side only of said coated film a continuous coating of polyethylene.

2. A process as in claim 1 wherein the base film is biaxially oriented, heat-set polyethylene terephthalate film.

3. A process as in claim 1 wherein said dilute aqueous solution contains 0.5-5% of said reaction product by weight of acetylacetone and said alkyl titanate.

4. A process as in claim 1 wherein said alkyl titanate is tetraisopropyl titanate.

5. A process as in claim 1 wherein said hygroscopic salt is calcium chloride.

6. A process as in claim 1 wherein said hygroscopic salt is magnesium chloride.

7. A process as in claim 1 wherein said hygroscopic salt is magnesium sulfate.

8. A heat-sealable, organic polymeric film comprising a polyethylene terephthalate base film having on both sides a continuous coating of the reaction product obtained by reacting 1 to 4 mols of acetylacetone with 1 mol of an alkyl titanate containing from 2 to 4 carbon atoms in the alkyl group and a hygroscopic salt selected from the group consisting of calcium chloride, magnesium chloride and magnesium sulfate and having on one side only a continuous top coating of a heat-sealable polymeric composition consisting essentially of polyethylene.

9. A film as in claim 8 wherein said reaction product is obtained by reacting acetylacetone with tetraisopropyl titanate.

10. A film as in claim 8 wherein the hygroscopic salt is calcium chloride.

11. A film as in claim 8 wherein the hygroscopic salt is magnesium chloride.

12. A film as in claim 8 wherein the hygroscopic salt is magnesium sulfate.

References Cited in the file of this patent

UNITED STATES PATENTS

| | | |
|---|---|---|
| 2,680,108 | Schmidt | June 1, 1954 |
| 2,768,909 | Haslam | Oct. 30, 1956 |
| 2,824,025 | McIntyre | Feb. 18, 1958 |
| 2,879,178 | McWherter | Mar. 24, 1959 |

FOREIGN PATENTS

| | | |
|---|---|---|
| 734,113 | Great Britain | July 27, 1955 |